(12) United States Patent
Eydelie et al.

(10) Patent No.: US 6,531,797 B2
(45) Date of Patent: Mar. 11, 2003

(54) ROTARY ELECTRIC MACHINE STATOR HAVING INDIVIDUAL REMOVABLE COILS

(75) Inventors: Andre Eydelie, Saint Yrieix (FR); Phillippe Augier, Champniers (FR); Jean-Marie Guillot, Blanzaguet-Saint Cybard (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/115,958

(22) Filed: Apr. 5, 2002

(65) Prior Publication Data

US 2002/0149278 A1 Oct. 17, 2002

(30) Foreign Application Priority Data

Apr. 17, 2001 (FR) .............................................. 0105187

(51) Int. Cl.$^7$ .............................................. H02K 11/00
(52) U.S. Cl. ........................................................ 310/71
(58) Field of Search .......................... 310/71, 208, 179, 310/180, 194; 29/596, 605

(56) References Cited

U.S. PATENT DOCUMENTS

| | | |
|---|---|---|
| 871,758 A | 11/1907 | Heitmann et al. |
| 1,045,159 A | 11/1912 | Lundell |
| 4,339,874 A | 7/1982 | McCarty et al. |
| 4,617,725 A | 10/1986 | Holter et al. |
| 5,091,668 A | 2/1992 | Cuenot et al. |
| 5,162,686 A | 11/1992 | Royer |
| 5,729,072 A | 3/1998 | Hirano et al. |
| 5,838,086 A | 11/1998 | Cuenot et al. |
| 5,841,212 A | 11/1998 | Mita et al. |
| 5,864,192 A | 1/1999 | Nagate et al. |
| 6,011,339 A * | 1/2000 | Kawakami .................. 310/208 |
| 6,025,665 A | 2/2000 | Poag et al. |
| 6,400,059 B1 * | 1/2002 | Hsu ............................ 310/254 |
| 6,369,473 B1 * | 4/2002 | Baumeister .................. 310/71 |

FOREIGN PATENT DOCUMENTS

| | | |
|---|---|---|
| DE | 700 420 C | 11/1940 |
| DE | 195 03 610 A1 | 8/1996 |
| DE | 199 03 409 C1 | 7/2000 |
| EP | 0 365 689 A1 | 5/1990 |
| EP | 0 438 594 A1 | 7/1991 |
| EP | 0 669 699 A1 | 8/1995 |
| EP | 0 777 312 A2 | 6/1997 |
| EP | 0 866 540 A1 | 9/1998 |
| EP | 0 872 943 A1 | 10/1998 |
| EP | 0 909 009 A1 | 4/1999 |
| EP | 1 010 660 A1 | 6/2000 |
| EP | 1 050 948 A2 | 11/2000 |
| FR | 2 784 815 | 4/2000 |
| GB | 258981 | 10/1926 |
| JP | 60-234451 A | 11/1985 |
| JP | 7-107707 A | 4/1995 |
| JP | 7-264822 A | 10/1995 |
| JP | 9-322455 A | 12/1997 |
| JP | 10-126990 | 5/1998 |
| JP | 10-146030 A | 5/1998 |
| JP | 2000-152537 A | 5/2000 |
| JP | 2000-333407 A | 11/2000 |

OTHER PUBLICATIONS

Weinmann, "Applications of NdFeB–magnets in motors", XP 000227187, RGE Review Generale de l'Electricite, No. 4, pp. 45–51, 1991.

* cited by examiner

*Primary Examiner*—Nestor Ramirez
*Assistant Examiner*—Iraj A Mohandosi
(74) *Attorney, Agent, or Firm*—Oliff & Berridge PLC

(57) ABSTRACT

The invention relates to a stator for a rotary electric machine. The stator comprising:
 a stator magnetic circuit having teeth and
 individual coils each engaged on a tooth,
 each coil including connection ends formed by respective flat bundles of stripped wires curved to form respective hook shapes,
 the connection ends being soldered to locally stripped portions of sheathed electric cables.

10 Claims, 5 Drawing Sheets

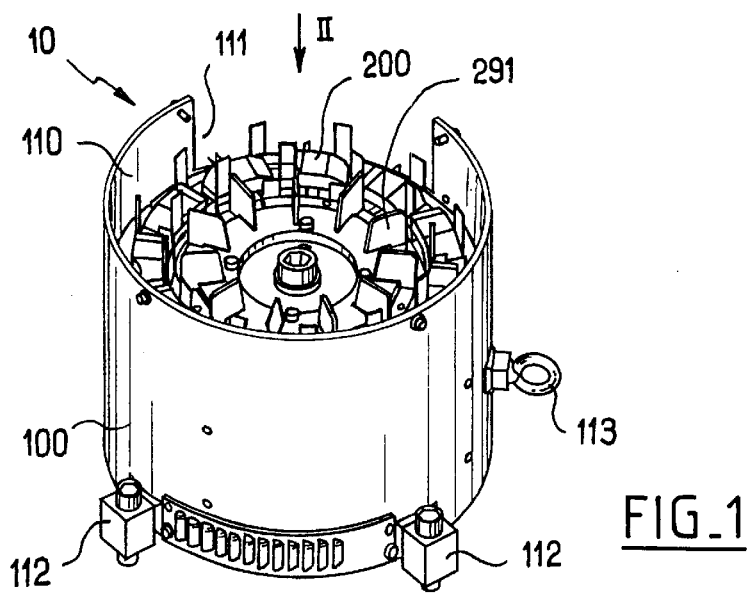
FIG_1
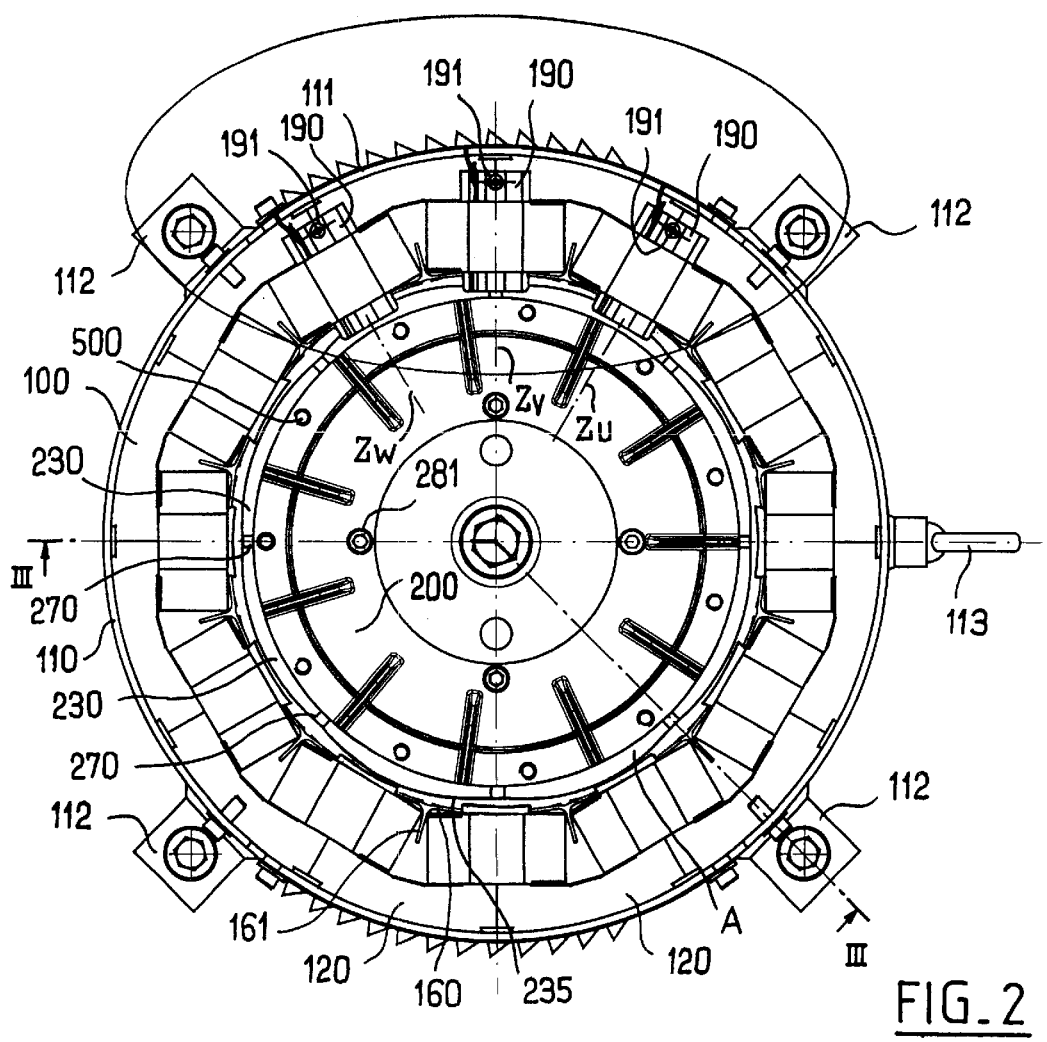
FIG_2

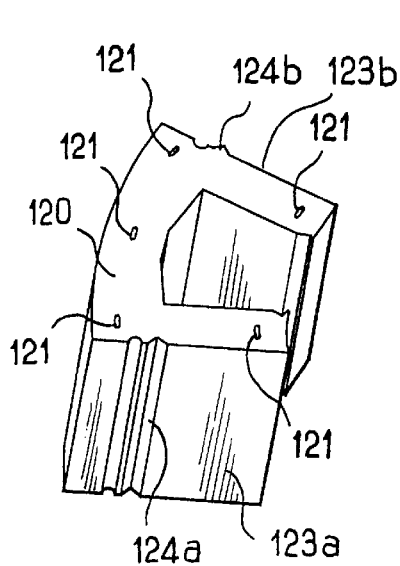
FIG_4
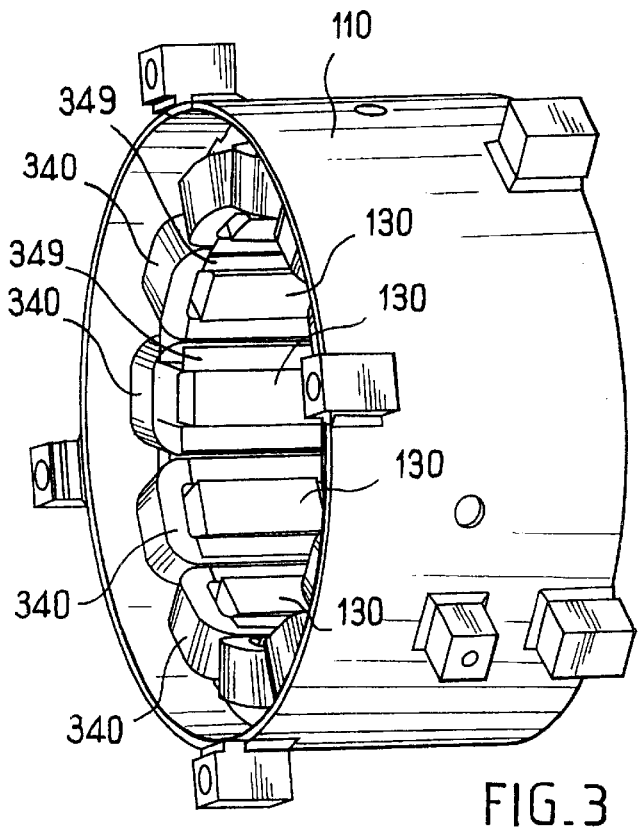
FIG_3
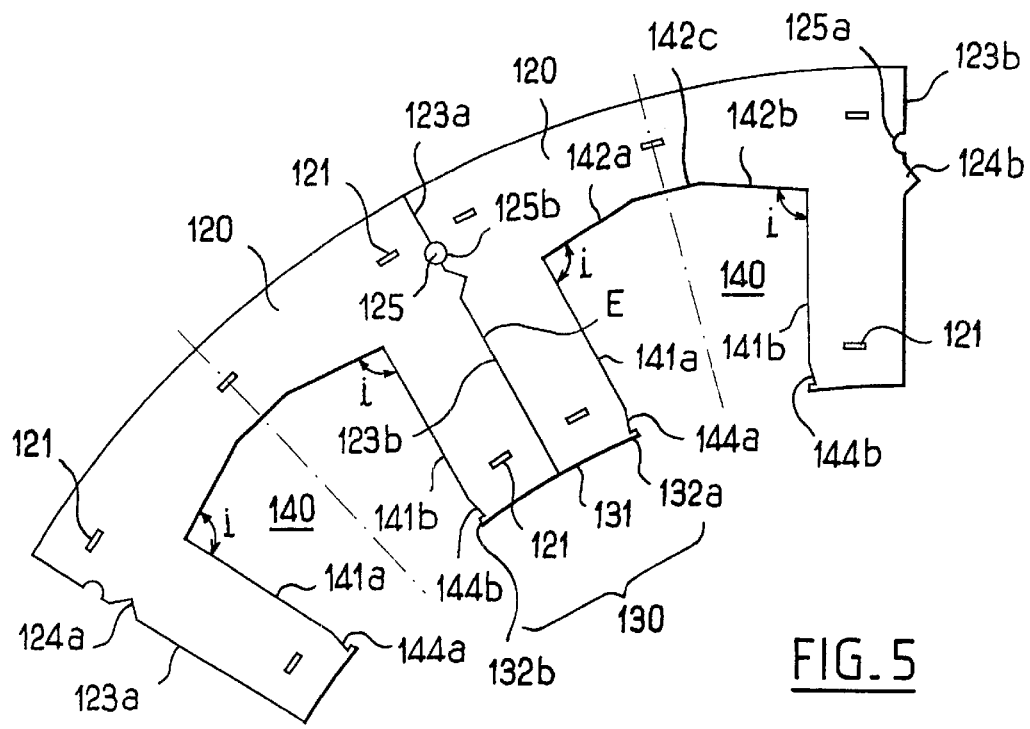
FIG_5

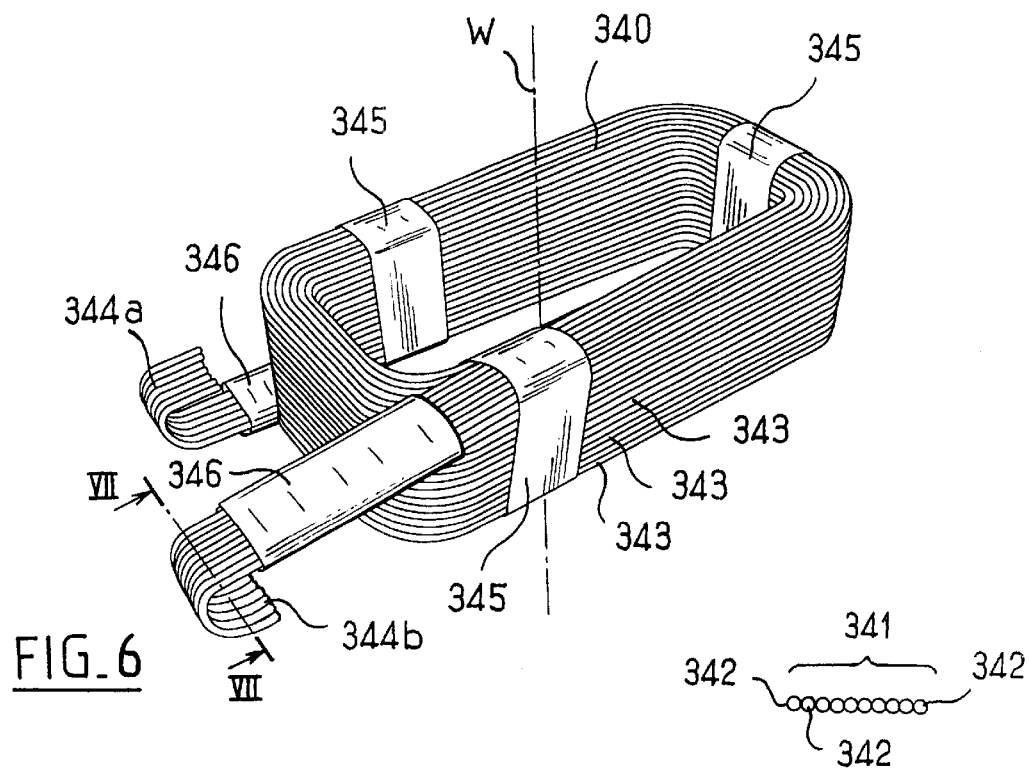
FIG. 6
FIG. 7
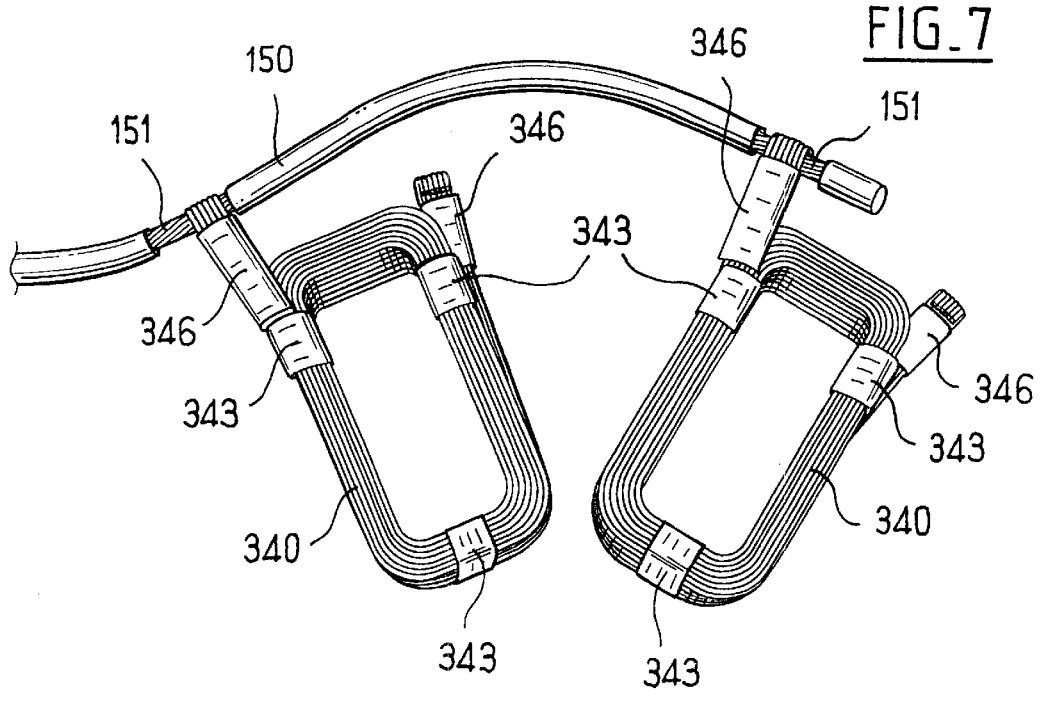
FIG. 8

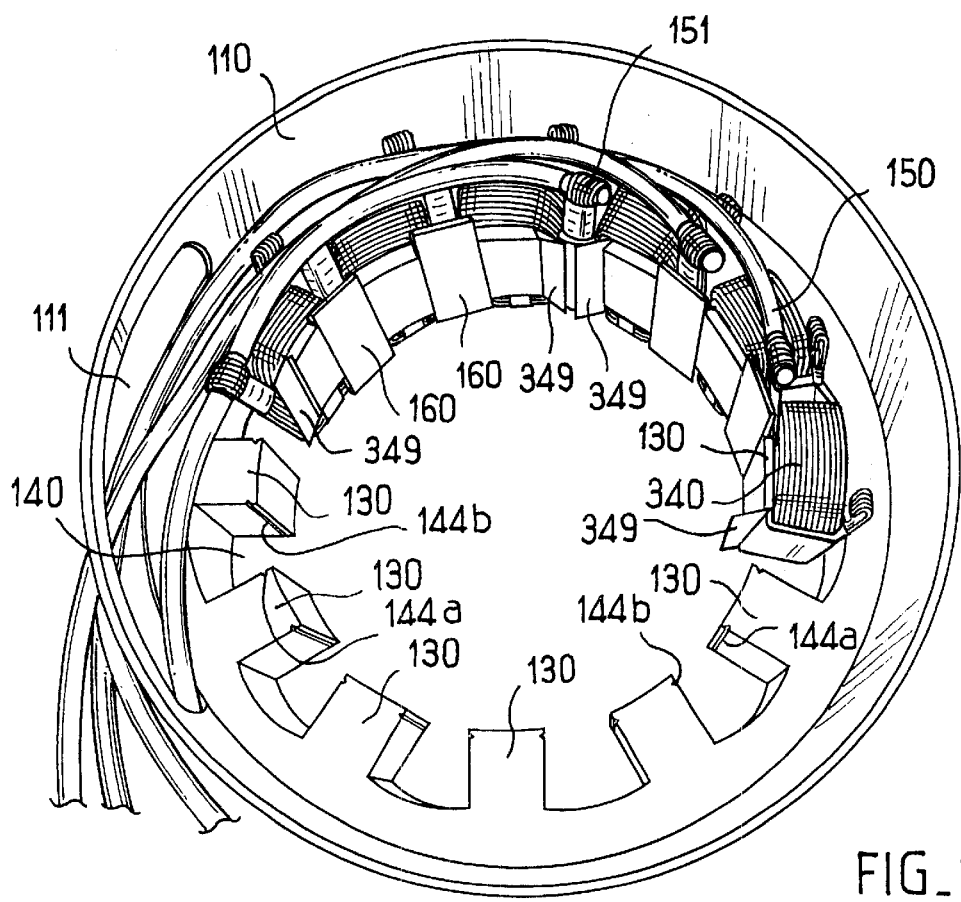
FIG_9
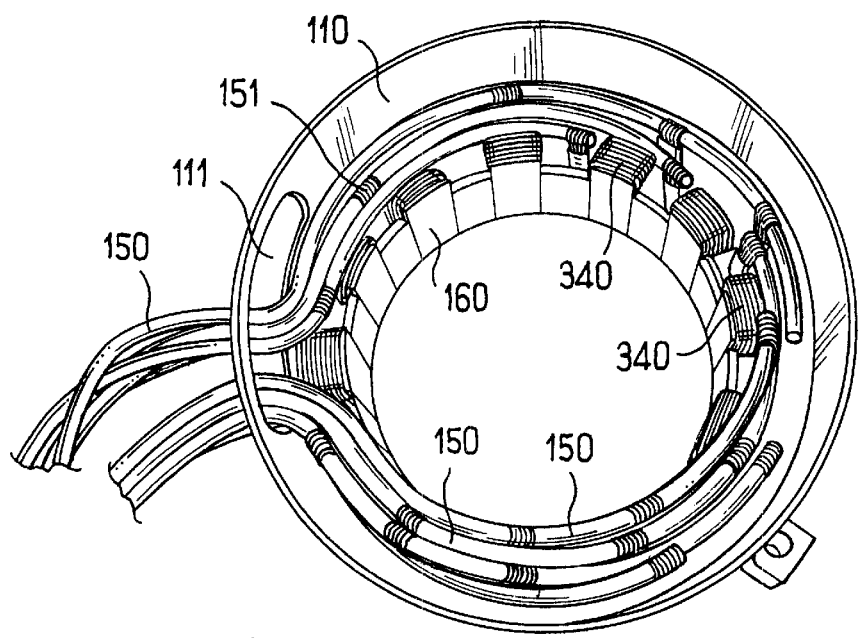
FIG_10

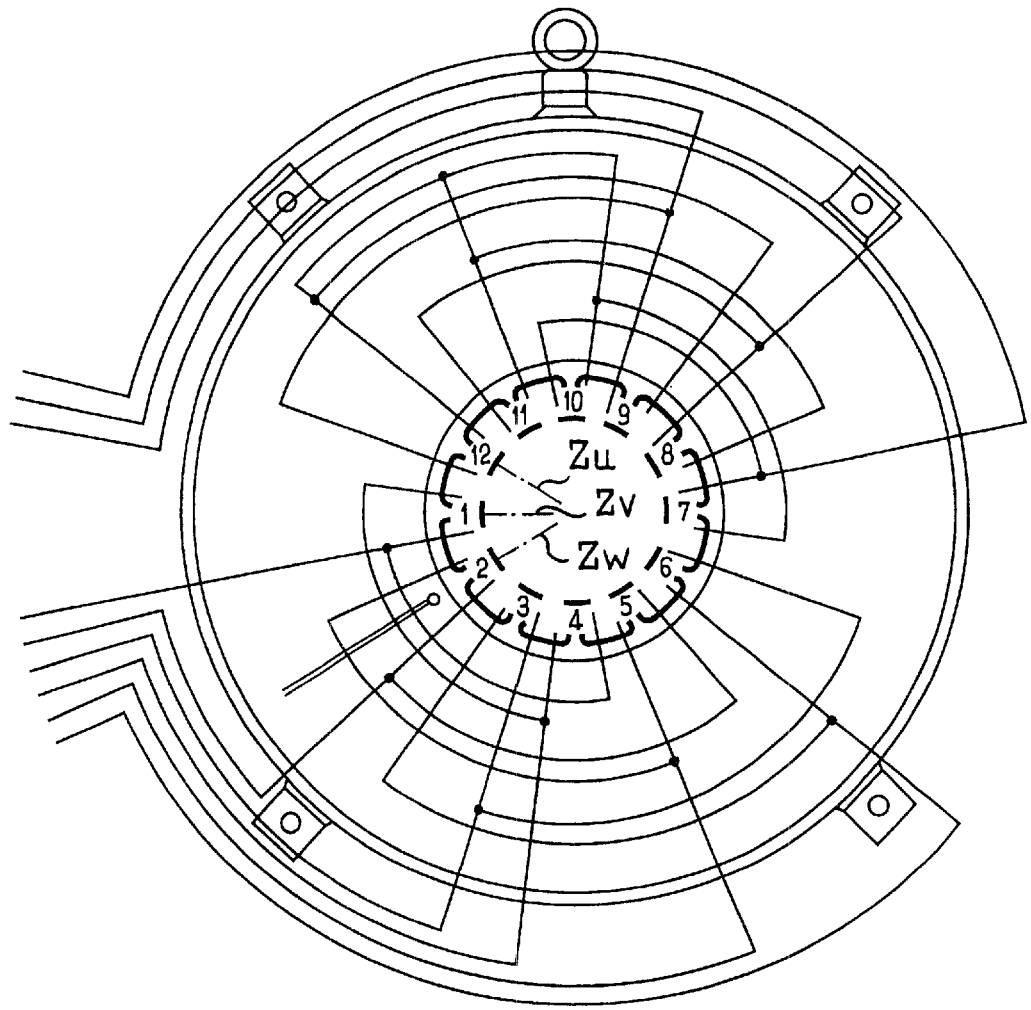
FIG_11

ROTARY ELECTRIC MACHINE STATOR HAVING INDIVIDUAL REMOVABLE COILS

The present invention relates to rotary electric machines and more particularly, but not exclusively, to synchronous motors.

BACKGROUND OF THE INVENTION

European patent application No. EP-A-0 872 943 discloses a rotary electric machine in which the rotor has magnets placed on its surface and the magnetic circuit of the stator receives individual coils. The stator exerts diametrically opposite rotating radial forces on the rotor. This causes the stator to be subjected to mechanical stress tending to ovalize it, thus generating vibration and noise. Finally, the width of the teeth is constant which gives rise to at least two drawbacks: firstly the magnetic material of the stator can become saturated at the roots of the teeth; and secondly replacing a coil requires the stator to be re-impregnated, so as to lock the coil properly in place on the stator, which means that the machine cannot be repaired on site and must be returned to the manufacturer.

OBJECTS AND SUMMARY OF THE INVENTION

In particular, the invention makes it easier to manufacture stators with windings on teeth, i.e. in which each tooth constitutes the core of a winding. In a stator with windings on teeth, the number of teeth $n_{teeth}$ is preferably a function of the number of pairs of poles $n_{pairs}$ and the number of phases $n_{phases}$ in compliance with the relationship $n_{teeth} = n_{pairs} * n_{phases}$.

The invention achieves this by means of a novel rotary electric machine stator comprising a stator magnetic circuit having teeth and individual coils each engaged on a tooth, each coil including connection ends formed by respective flat bundles of stripped wires curved to form respective hook shapes, said connection ends being soldered to locally stripped portions of sheathed electric cables.

The use of individual coils as defined above, in combination with sheathed electric cables, makes the machine easier to build and maintain. In particular, a coil can easily be replaced without having to return the machine to the manufacturer, thereby making it possible to reduce the period of time in which the installation associated with the machine is out of service.

The above-mentioned hooks can be directed towards the midplane of the coil perpendicular to the winding axis of the coil, thereby enabling the machine to be more compact.

In a particular embodiment, each tooth presents two substantially plane and non-parallel opposite faces which converge at an angle towards the rotor, and each coil presents an inside section having two opposite faces forming an angle that is substantially equal to that of the teeth, in such a manner as to be able to be wedged thereon.

This clamping effect is particularly useful in contributing to ensuring that a pre-impregnated replacement coil does not move once it has been mounted on the stator, without it being necessary to reimpregnate the entire stator in an insulating resin. Such a clamping effect is not possible with the machine described in patent application EP-A-0 872 943 in which the teeth are of constant width. In addition, another advantage of having teeth of width that increases starting at a certain distance from their free ends going away from the rotor lies in the greater section offered to the magnetic field lines reducing the risk of the magnetic laminations becoming saturated. This makes it possible to use a magnetic material that is less expensive.

In a particular embodiment, each individual coil comprises a bundle of insulated wires, the bundle being substantially flat and wound around a winding axis in such a manner as to form a plurality of superposed turns, the cross-section of the bundle in the superposed turns having a long dimension that extends substantially perpendicularly to the winding axis of the coil. The wires are preferably circular in section, having a diameter that lies in the range 0.3 millimeters (mm) to 2.5 mm, for example. This configuration makes it possible to reduce high frequency losses within the copper at high speeds of rotation of the rotor.

In such a coil, the turns can be touching, thereby ensuring that the slots are well filled.

The inside section of the coil is preferably substantially rectangular. Advantageously it is wider on one side than on the other so as to allow it to be mounted on a tooth of complementary profile with a certain amount of clamping, as mentioned above.

In a particular embodiment, the teeth of the stator include cutouts enabling support shims of the individual coils mounted on the teeth to be fixed on the stator, each shim including a separating partition extending substantially to the middle of the corresponding slot.

Each coil advantageously presents an inside section whose long side is longer than the axial size of the tooth on which it is engaged so as to leave a gap that is large enough to pass a detector that serves to deliver a signal representative of the rotation of the rotor. The machine advantageously includes at least one magnetic field detector mounted on the stator in such a manner as to detect the magnetic field of the rotor magnets from a location that overlaps a peripheral region of the rotor when the machine is observed on the axis of rotation of the rotor. This peripheral region is advantageously the region which extends around an end cheek-plate situated so as to be set back from the radially outer edge of the magnets.

For n-phase AC, the machine preferably has n detectors mounted on n consecutive teeth close to an opening through a case of the machine. Such a detector or detectors can be fixed on a face of the magnetic circuit of the stator and each can extend along the radial axis of the corresponding tooth. Advantageously each detector passes through the coil engaged on the corresponding tooth, as mentioned above. This enables the machine to be more compact.

The invention also provides a synchronous motor comprising a permanent magnet rotor, preferably a flux-concentrating rotor, and a stator with windings on teeth as defined above.

The combination of a flux-concentrating rotor and a stator with windings on teeth makes it possible to have a machine that is relatively powerful in a small volume, thus making it possible in particular to mount the motor in a cantilevered-out position at the end of a shaft, thereby reducing the number of bearings.

Such a structure also enables the cost of the machine to be reduced since the number of teeth and the number of coils is relatively small.

In addition, the stator is compact since the heads of the coils are short.

The phases can be separated electrically without contact and without crossovers.

The invention also provides a method of manufacturing a stator, the method comprising the following steps:

manufacturing a stator magnetic circuit having teeth;

manufacturing individual coils each having electrical connection ends formed by respective flat bundles of stripped wires curved to form respective hook shapes; and soldering the electrical connection ends of the coils to sheathed cables that are partially stripped at the connection points with the coils.

BRIEF DESCRIPTION OF THE DRAWINGS

Other characteristics and advantages of the present invention will appear on reading the following detailed description of non-limiting embodiments of the invention, and on examining the accompanying drawings, which drawings form an integral portion of the description, and in which:

FIG. 1 is a diagrammatic perspective view of a synchronous motor constituting an embodiment of the invention;

FIG. 2 is a diagrammatic plan view looking along arrow II of FIG. 1;

FIG. 3 shows the stator in isolation, in perspective, and in diagrammatic manner;

FIG. 4 shows a sector of the magnetic circuit of the stator in isolation and in perspective;

FIG. 5 shows how the FIG. 4 sector is assembled with an identical sector;

FIG. 6 shows an individual coil in isolation and in perspective;

FIG. 7 is a section on VII—VII of FIG. 6;

FIG. 8 is a diagram showing a set of coils used for making the stator;

FIG. 9 is a diagram showing how sets of coils are put into place on the stator during manufacture thereof;

FIG. 10 is a view analogous to FIG. 9, in highly diagrammatic and simplified form once all of the sets of coils have been put into place, to show the circular paths followed by the current-feed cables; and FIG. 11 is a diagram showing one way in which the coils can be interconnected (coils numbered 1 to 12).

MORE DETAILED DESCRIPTION

FIGS. 1 and 2 show a synchronous motor 10 of the invention comprising a stator 100 and a rotor 200. The motor 10 is brushless, it has a flux-concentrating rotor, and its stator has windings on teeth, and it operates on three-phase AC.

The stator 100 has a steel case 110 with a lateral opening 111 in particular for passing electrical conductors for powering the stator windings. On the outside, the case is provided with fixing tabs 112 and with a hook 113 for hoisting purposes.

In the example shown, the stator 100 has a magnetic circuit that comprises a plurality of identical sectors 120, one of which is shown in isolation, in perspective in FIG. 4.

Each sector 120 is constituted by a stack of identical magnetic laminations that are superposed and clipped together so as to constitute a unitary assembly, with clipping being obtained using a conventional technique whereby each lamination is subjected to spot deformation at a plurality of assembly points 121. Using a stack of magnetic laminations serves to limit losses due to induced currents. In a variant, the magnetic circuit of the stator could be formed by superposing laminations, each of generally annular shape, and then cutting out all of the teeth 130 of the stator therefrom. In another variant, each of the sectors could include a plurality of teeth. When assembled together, two adjacent sectors 120 form a tooth 130, which tooth is used for receiving an individual coil 340, as can be seen in FIG. 5 in particular. The number of teeth in the example described is twelve, and the motor is designed to be powered with three-phase AC and the rotor has 8 poles. Naturally, the number of rotor poles could be different and in particular it could be equal to 12 or 16, for example. Although presenting certain drawbacks as mentioned above, the stator could also have a number of stator teeth that is not associated with the number of rotor pole pairs $n_{pairs}$ and the number of phases $n_{phases}$ by the relationship $n_{teeth}=n_{pairs}*n_{phases}$.

On its sides 123a and 123b for co-operating with adjacent sectors 120, each sector 120 has respective portions in relief 124a and 124b. These portions in relief 124a and 124b are complementary in shape having a profile that is generally triangular when seen from above, one being recessed and the other projecting, and having two sides that are substantially rectilinear and interconnected by a rounded portion. Co-operation between the portions in relief 124a and 124b contributes to positioning the sectors 120 properly relative to one another while assembling the magnetic circuit of the stator. Each sector 120 also has respective grooves 125a and 125b in its sides 123a and 123b, each groove being of semicircular cross-section and situated in the vicinity of the portions in relief 124a and 124b so that two adjacent grooves together form a hole 125 of circular section when the sectors 120 are assembled together. These holes 125 serve for receiving three detectors 190 as described in greater detail below.

In FIG. 5, it will be observed that the air-gap E at the interface between two adjacent sectors 120 occupies the middle of the corresponding tooth 130, thereby enabling magnetic losses to be reduced while the machine is in operation since magnetic flux can flow from one-half tooth to the adjacent half-tooth within the same sector 120 without encountering an air-gap. In addition, the sectors can be made with elements that are cut out practically without scrap using cutting tools of relatively small size, i.e. tools capable of high rates of throughput.

The sectors 120 are forced as a whole into the cylindrical case 110, and the magnetic circuit formed by the sectors 120 is held together by the radial compression forces exerted by the case 110 on the sectors 120, with the bearing surfaces between sectors being relatively large.

Each sector 120 defines a slot 140 whose opposite sides 141a and 141b are at an angle i of more than 90° relative to the adjacent regions 142a and 142b of the bottom of the slot 140, which regions are themselves perpendicular to radii passing through the line where the corresponding tooth meets the bottom of the slot. In the embodiment shown, the angle i is 90.4°, but this value is merely an example.

Each of the sides 123a and 123b of the sectors is generally in alignment with a radius, ignoring the portions in relief 124a, 124b, 125a, and 125b, and the width of each tooth 130 increases slightly on going away from the rotor (ignoring the cutouts 144a or 144b formed close to its free end 131 facing the rotor).

It will be observed on examining FIG. 5 that in the vicinity of its free end 131 each tooth 130 does not have pole swellings, in contrast to many known stators which present slots that are semi-closed. In the example shown, the end portions 132a and 132b of each tooth 130 situated between the free end 131 and the cutouts 144a or 144b are in alignment with the sides 141a and 141b respectively. The free end 131 is a circularly cylindrical portion on the same axis as the axis of rotation of the rotor, and it is concave towards the rotor.

The bottom of each slot includes a middle region 142c interconnecting the regions 142a and 142b and perpendicular to a radius intersecting the slot 140 at half-width, as represented by chain-dotted lines in FIG. 5.

As mentioned above, each tooth 130 receives an individual coil 340 occupying substantially half of the volume of each of the slots 140 adjacent to the tooth 130 in question.

FIG. 6 shows an individual coil 340 in isolation. This coil is formed by winding a bundle 341 of enameled electric wires 342 around a winding axis W, the bundle being substantially flat in cross-section, as can be seen in FIG. 7.

When the bundle 341 is observed in cross-section through the turns, its long dimension extends substantially parallel to the winding axis W.

In the example shown, the bundle 341 has ten individual conductors 342, each of circular section. The bundle 341 forms about twenty superposed turns 343. Within the turns, the conductors 342 are electrically insulated from one another by using wire that is enameled. The conductors 342 are stripped at their ends to form electrical connection ends 344a and 344b, each of which is curved towards the midplane of the coil perpendicular to the winding axis W so as to form a hook. At the end of the coil manufacturing process, each of these hooks is open towards the body of the coil.

FIG. 6 shows that all of the conductors 342 at the end 344a are curved upwards and then towards the body of the coil, while the end wires 344b are curved downwards and then towards the body of the coil. The ends 344a and 344b do not project significantly beyond the planes of the two end faces of the coil. The turns constituting the coil body can be held in the superposed state by adhesive strips of cloth 345 prior to being impregnated in resin. Sleeves 346 of insulating sheath are engaged on the portions of the bundle 341 that extend between the ends 344a, 344b and the body of the coil.

The inside section of the coil 340 is generally rectangular in shape, as can be seen in FIG. 8. The coils 340 are wound on formers having two opposite large faces that are plane, making between them the same angle as between the sides 141a and 141b of a tooth, such that the width of the inside section of each coil varies perceptibly from one end face to the opposite face. This can be perceived if any attempt is made to mount a coil the wrong way round on a tooth 130 of the stator 100.

In FIG. 8, it can be seen that the coils 340 are electrically connected via one or other of the electrical connection ends 344a or 344b to partially-stripped sheathed electrical conductors 150 prior to being mounted on the teeth 130 of the stator 100. The hooks formed by the ends 344a and 344b are arranged in such a manner as to fit substantially around the outside diameter of the electrical conductors 150 in the stripped portions 151. These stripped portions can be formed not only at the ends of the electrical conductors 150 but also between them, by removing a limited length of insulating plastics material sheath.

In the example described, sets of two coils 340 are made up and subsequently mounted on the corresponding teeth 130, as shown in FIG. 9. Sheets 349 of insulation are interposed between the teeth and the bottoms of the slots and the coils. The ends of these sheets 349 can be seen in FIGS. 3 and 9.

As more and more coils 340 are mounted on the teeth 130, pieces of support shim 160 are slid into the cutouts 144a, 144b so as to close off the slots 140. As can be seen in FIG. 2, these pieces of shim 160 include partitions 161 extending between the portions of the two coils 340 that are received in the corresponding slot 140.

Once all of the coils 340 are in position, the cables 150 extend along substantially circular paths on one side of the magnetic circuit of the stator, being set back from the free ends 131 of the teeth, as shown in FIG. 10, these cables being attached to one another by collars, and then the stator is impregnated with an insulating resin in conventional manner. The particular electrical connections between the twelve coils is shown in FIG. 11, but that is merely one example.

It will be understood that it is particularly advantageous to use individual coils 340 installed on teeth of non-constant width in the manner described above, since that makes it much easier to replace coils 340. To replace a coil 340, once the rotor 200 has been removed, it suffices to unsolder the ends 344a and 344b of a coil from the corresponding stripped portions 151 and to remove the pieces of shim 160 concerned, whereupon the coil 340 can be extracted. A resin-impregnated replacement coil 340 can then be put into place by being engaged on the previously released tooth 130, after which its ends 344a and 344b can be soldered to the stripped portions 151. The convergence of the sides 141a and 141b of the tooth 130 towards the rotor and the corresponding shape of the inside section of the coil contribute to preventing the coil from moving on the tooth 130. A repair can be performed on site without it being necessary to return the machine to the manufacturer, and without it being necessary to re-impregnate the stator, thus making it possible to shorten repair time. The motor 10 can advantageously be shipped together with one or more replacement coils 340.

The rotor 200 is a flux-concentrating rotor and includes a plurality of radially extending magnets 270 disposed between pole pieces 230. The magnetization of the magnets i270 is transverse. The pole pieces 230 are not connected together magnetically, said pole pieces being fixed on a non-magnetic shaft made of aluminum.

The magnets 270 which present low electrical resistivity, are not subjected to heating that runs the risk of demagnetizing them because of the protection provided by the pole pieces against induced currents in their surfaces.

An annular zone A is provided around a cheek-plate fixed on the rotor in which it is possible to read the magnetic field of the magnets 270 of the rotor by means of detectors 190 of the kind shown in FIG. 2.

In the embodiment described, there are three detectors 190, since the motor is a three-phase motor, with each detector comprising a Hall effect sensor arranged to detect the magnetic field over the peripheral region A of the rotor 200 around the above-mentioned end cheek-plate. The magnetic field is read along an axis parallel to the axis of rotation of the rotor, the Hall effect sensor overlapping the peripheral region A. The detectors 190 are mounted on three consecutive teeth 130 situated in the vicinity of the opening 111.

In FIG. 2, it can be seen that the detectors 190 can overlap the rotor 200 to a small extent because the end cheek-plate is in a slightly set-back position.

Each detector 190 is fixed by a screw 191 on a tooth 130 of the stator, said screw 191 being engaged in a hole 125. Each detector 190 extends along the radial axis $Z_u$, $Z_v$, or $Z_w$ of the associated tooth and passes through the coil 340 engaged on that tooth. The coils 340 are provided for this purpose with an inside section of length that is large enough to enable the detector 190 to be passed. The space left between a coil and the corresponding tooth for passing the detector can be about 5 mm, for example, with such a space serving to insulate the coil from the tooth where there is no insulation 349.

It is advantageous to read the magnetic field of the permanent magnets 270 directly because that makes it possible to avoid adding special elements to the rotor whose sole purpose is to enable the angular position of the rotor to be read. This simplifies manufacture of the rotor and improves reliability. In addition, mounting detectors 190 in the gap between the coils 340 and the teeth 130 is particularly compact, while nevertheless providing easy access to the detectors 190 in order to replace them, should that be necessary.

Each detector 190 is positioned inside a coil 340 of given phase (u, v, and w). Each detector 190 makes it possible to detect which polarity of the rotor lies in register with the associated coil (and thus the corresponding phase) at a given instant. Each detector 190 delivers a high signal or a low signal depending on the polarity it detects. Each detector 190 has an electronic circuit for shaping the signals delivered by the Hall effect sensors so as to reduce sensitivity to interference. Depending on the position of the rotor, the various signals delivered by the detectors 190 can take up six possible combinations, and each change in the triplet constituted by the states of the detectors 190 corresponds to a determined angular position of the rotor. This makes it possible to determine the angular position of the rotor at precise instants, and to compute the position of the rotor between these instants by interpolation, given knowledge of its speed. The coils 340 can thus be excited in optimum manner with the desired amount of phase shift. The electrical current carried by each coil can thus be reduced to zero and change direction whenever a magnet lies on the axis of the corresponding tooth.

On at least one of its end cheek-plates, the rotor 200 has cooling fins 291 which can be seen in FIG. 1, in particular. It will be observed that an additional cooling effect is obtained by the presence of the lobes 235 formed by the pole pieces 230 at the periphery of the rotor, which make it possible to generate a flow of cooling air within the inside of the motor.

The invention makes it possible to manufacture rotary electric machines from a range of stator and rotor magnetic circuits that are prefabricated, of different diameters, with the stators presenting teeth that are standard. The axial dimensions of the magnetic circuits of the rotor and of the stator can be selected as a function of the power to be delivered, by stacking a larger or smaller number of sectors and of pole pieces. Only the coils need to be made to measure for a stator magnetic circuit built up from prefabricated elements, by determining the number of turns in the coil, the diameter of the conductor wires in its flat bundle, and the number of said wires, as a function of the performance required by the user of the machine.

The invention is not limited to a synchronous motor and it is also applicable to manufacturing a generator. The rotor can be internal or external.

The electrical power of the machine can lie in the range 1 kilowatt (kW) to 750 kW, for example. The speed of rotation of the rotor can lie in the range 1000 rpm to 10,000 rpm, for example. A machine of the invention can also find applications when speed is below 1000 rpm. The outside diameter of the machine can lie in the range 50 mm to 1 meter (m), for example; in the most widespread applications, the outside diameter can lie in the range 100 mm to 600 mm.

The invention is not limited to some particular number of poles nor is it limited to the stator being powered with three-phase AC. Electricity can be polyphase having $n_{phases}$ phases, where n is not equal to three.

The coils can be made in some other way.

What is claimed is:

1. A rotary electric machine stator comprising:

a stator magnetic circuit having teeth and individual coils each engaged on a tooth, each coil including connection ends formed by respective flat bundles of stripped wires curved to form respective hook shapes, said connection ends being soldered to locally stripped portions of sheathed electric cables.

2. A stator according to claim 1, wherein said coil has a midplane perpendicular to a winding axis and said hook-shaped electrical connection ends are directed towards said midplane.

3. A stator according to claim 1, wherein each tooth presents two substantially plane and non-parallel opposite faces which converge at an angle towards the rotor, and wherein each coil presents an inside section having two opposite faces forming an angle that is substantially equal to that of the teeth, in such a manner as to be able to be wedged thereon.

4. A stator according to claim 1, wherein each individual coil comprises a bundle of insulated wires, said bundle being substantially flat and wound around a winding axis in such a manner as to form a plurality of superposed turns, the bundle having a cross-section in the superposed turns which has a long dimension that extends substantially perpendicularly to said winding axis of said coil.

5. A stator according to claim 4, wherein said wires are of circular section.

6. A stator according to claim 1, wherein each coil has an inside section being substantially rectangular.

7. A stator according to claim 6, wherein said inside section of the coil has two sides and is wider on one side than an the other.

8. A stator according to claim 1, wherein said teeth of said stator include cutouts enabling support shims of said individual coils mounted on said teeth to be fixed on said stator, two teeth defining between them a slot, each shim including a separating partition extending substantially to the middle of the corresponding slot.

9. A stator according to claim 1, wherein each coil has a substantially rectangular inside section of long side longer than the axial dimension of the tooth on which it is engaged so as to leave a gap which is sufficient to receive a detector suitable for delivering a signal representative of rotation of the rotor.

10. A synchronous motor comprising a permanent magnet rotor and a flux-concentrating rotor, and a stator as defined in claim 1.

* * * * *